(12) United States Patent
Scheid et al.

(10) Patent No.: US 11,918,961 B2
(45) Date of Patent: Mar. 5, 2024

(54) DROPLET AND/OR BUBBLE GENERATOR

(71) Applicant: UNIVERSITE LIBRE DE BRUXELLES, Brussels (BE)

(72) Inventors: Benoit Scheid, Brussels (BE); Adrien Dewandre, Profondeville (BE); Youen Vitry, Brussels (BE)

(73) Assignee: UNIVERSITE LIBRE DE BRUXELLES, Brussels (BE)

( * ) Notice: Subject to any disclaimer, the term of this patent is extended or adjusted under 35 U.S.C. 154(b) by 1036 days.

(21) Appl. No.: 16/628,616

(22) PCT Filed: Jul. 3, 2018

(86) PCT No.: PCT/EP2018/067960
§ 371 (c)(1),
(2) Date: Jan. 3, 2020

(87) PCT Pub. No.: WO2019/007965
PCT Pub. Date: Jan. 10, 2019

(65) Prior Publication Data
US 2021/0146319 A1    May 20, 2021

(30) Foreign Application Priority Data
Jul. 4, 2017   (EP) ..................................... 17179585

(51) Int. Cl.
*B01F 23/00*      (2022.01)
*B01F 23/232*   (2022.01)
(Continued)

(52) U.S. Cl.
CPC ........ *B01F 23/4105* (2022.01); *B01F 23/232* (2022.01); *B01F 33/3011* (2022.01);
(Continued)

(58) Field of Classification Search
CPC .................. B01F 35/2213; B01F 35/10; B01F 2215/0431; B01J 4/002; B01J 13/0004
See application file for complete search history.

(56) References Cited

U.S. PATENT DOCUMENTS

| 2013/0014828 A1 | 1/2013 | Kim et al. |
| 2013/0099018 A1 | 4/2013 | Miller |

(Continued)

FOREIGN PATENT DOCUMENTS

| CA | 2953731 A1 | 1/2016 |
| DE | 102009001612 A1 | 9/2010 |

(Continued)

OTHER PUBLICATIONS

Anna, Shelley Lynn, "Droplets and Bubbles in Microfluidic Devices", Annual Review of Fluid Mechanics, 48(1):285-309, Jan. 2016.

(Continued)

*Primary Examiner* — Anshu Bhatia
(74) *Attorney, Agent, or Firm* — Kolitch Romano Dascenzo Gates LLC (57) ABSTRACT

A device for generating bubbles or droplets may include a cavity comprising a first pressurized phase, at least one input capillary of a second phase, and an output capillary coaxially aligned with the at least one input capillary. The opening of the tip of the at least one input capillary has an internal diameter of less than half the internal diameter of the output capillary. The cross section of the cavity may be selected so that, in use, the average speed field in the cavity is quasi-static.

12 Claims, 5 Drawing Sheets

(51) Int. Cl.
  *B01F 23/41* (2022.01)
  *B01F 33/3011* (2022.01)
  *B01F 35/10* (2022.01)
  *B01F 35/21* (2022.01)
  *B01F 35/221* (2022.01)
  *B01F 35/71* (2022.01)
  *B01J 4/00* (2006.01)
  *B01J 13/00* (2006.01)
  *B33Y 10/00* (2015.01)
  *B33Y 80/00* (2015.01)

(52) U.S. Cl.
  CPC .......... *B01F 35/10* (2022.01); *B01F 35/2111* (2022.01); *B01F 35/2213* (2022.01); *B01F 35/71745* (2022.01); *B01J 4/002* (2013.01); *B01J 13/0004* (2013.01); *B33Y 10/00* (2014.12); *B33Y 80/00* (2014.12); *B01F 2215/0431* (2013.01)

(56) References Cited

U.S. PATENT DOCUMENTS

| | | | |
|---|---|---|---|
| 2016/0281140 A1 | 9/2016 | Miller et al. | |
| 2017/0319443 A1* | 11/2017 | Weitz | A23P 10/30 |
| 2019/0105619 A1* | 4/2019 | Wilson | G16H 40/63 |

FOREIGN PATENT DOCUMENTS

| | | |
|---|---|---|
| JP | A2004067953 A | 3/2004 |
| JP | A2010142725 A | 1/2010 |
| WO | 2016030551 A1 | 3/2016 |
| WO | 2016085739 A1 | 6/2016 |

OTHER PUBLICATIONS

Guillot, Pierre et al. "Stability of a Jet in Confined Pressure-Driven Biphasic Flows at Low Reynolds Numbers", Physical Review Letters, 99(10):104502, Sep. 2007.

Utada et al., "Monodisperse Double Emulsions Generated from a Microcapillary Device", Science, 308(5721):537-541, Apr. 2005.

Erb et al., "Predicting sizes of droplets made by microfluidic flow-induced dripping", Soft Matter, 7, 8757-8761, 2011.

Utada et al, "Absolute Instability of a Liquid Jet in a Coflowing Stream" Physical Review Letters, 100(1):014502, Jan. 2008.

A. Evangelio et al., "Simple and double microemulsions via the capillary breakup of highly stretched liquid jets", Journal of Fluid Mechanics, 804:550-577, Oct. 2016.

Dec. 5, 2018, International Search Report and Written Opinion from the European Patent Office in PCT/EP2018/067960, which is the international application to this application.

* cited by examiner

DROPLET AND/OR BUBBLE GENERATOR

FIELD

The device of the present disclosure is a microfluidic device for the high flow rate generation of micro-sized and monodisperse droplets and/or bubbles.

BACKGROUND

Bubbles and droplets are well-established elementary components in microfluidic for mixing, dissolving, reacting, crystallizing, or transporting species in a well-controlled manner as described in *Droplets and Bubbles in Microfluidic Devices*, Annual Review of Fluid Mechanics, 48(1):285-309, January 2016 by Shelley Lynn Anna. The most common configurations to produce bubbles and droplets are T-junction, flow-focusing and co-flow, the latter having the unique advantage that the phase to be dispersed is never in contact with the microchannel walls, preventing laborious and often ephemeral wettability treatments of these walls. Droplet formation in a co-flow relies on the Rayleigh-Plateau instability, thus requiring interfacial tension between the dispersed and the continuous phase.

Figure 1:
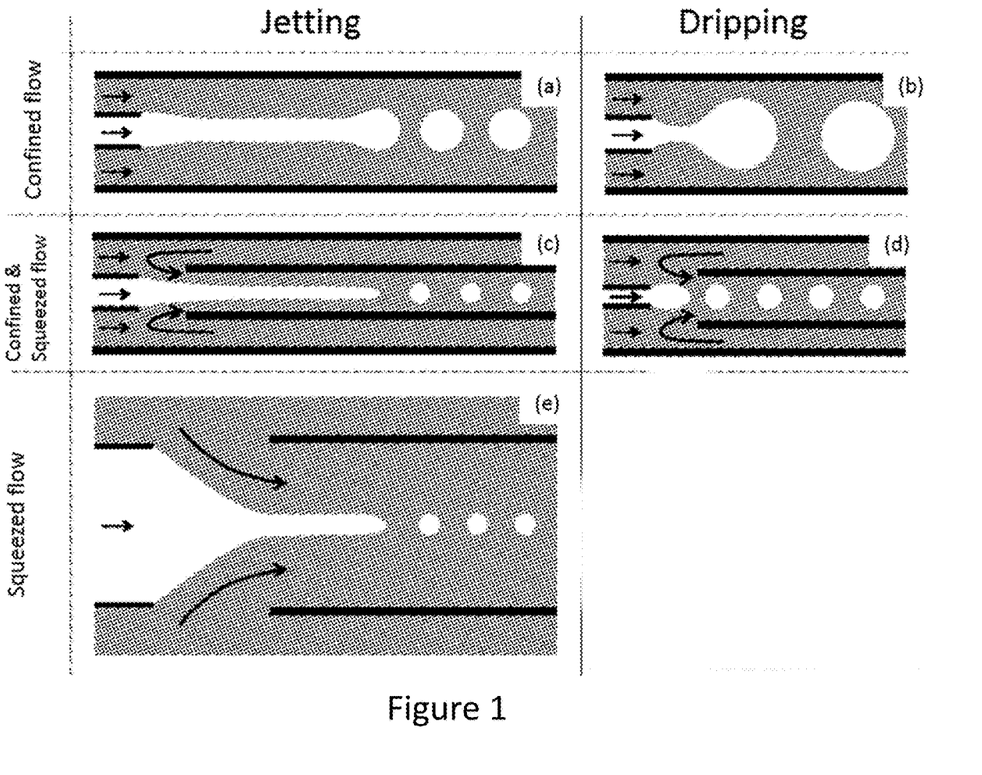
FIG. 1 represents prior art setup.

The local stability analysis of the co-flowing base state leads to determining the transition between an absolute instability—for a perturbation that has a zero group velocity and will thus grow locally in space—, and a convective instability—for a perturbation that has a positive group velocity and will thus be advected with the flow. It is commonly accepted that the dripping to jetting transition, as illustrated in FIG. 1, approximately coincides with the absolute/convective instability transition, as was shown for the confined flow configuration in the frame of the lubrication approximation by Pierre Guillot, Annie Colin, Andrew S. Utada, and Armand Ajdari in *Stability of a Jet in Confined Pressure-Driven Biphasic Flows at Low Reynolds Numbers* in Physical Review Letters, 99(10):104502, September 2007.

With the aim to increase the emulsification throughput, Weitz et Al. have introduced an additional extraction tube in the confined co-flow configuration in order to squeeze the flow (see FIG. 1 c-d) and displace the dripping/jetting transition to higher flow rates as described in *Monodisperse Double Emulsions Generated from a Microcapillary Device*, Science, 308(5721):537-541, April 2005. A model describing the size of the droplets generated in this configuration has been developed by Erb et Al. as described in Predicting sizes of droplets made by microfluidic flow-induced dripping, Soft Matter, 7, 8757-8761, 2011. Indeed, the dripping regime is preferred in practice to the jetting regime as it is associated to an absolute instability with a fixed eigenmode, a situation favorable to the generation of monodisperse droplets. On the contrary, the jetting regime is associated to a convective instability that has a wide band of unstable modes and behaves like a noise amplifier, leading usually to some dispersion in the droplet sizes.

Jetting and dripping regimes in confined configurations are influenced by shear stresses exerted on the dispersed phase by the continuous phase, and is thus limited by the maximum pressure drop that the system can support (see Andrew S. Utada, Alberto Fernandez-Nieves, Jose M. Gordillo, and David A. Weitz, *Absolute Instability of a Liquid Jet in a Coflowing Stream*. Physical Review Letters, 100(1): 014502, January 2008).

In WO 2016/085739, Weitz et Al. describes another confined configuration wherein concentrical tubings produce complex droplets within droplets. In this document, an outer tubing confines the entire device. This confinement is rendered necessary by the injection of two phases in opposite directions in the external tubing, a third liquid being injected through an inner concentrical input tubing, and the ternary produced droplets being extracted by an inner concentrical output tubing. WO 2016/085739 does not disclose an external cavity providing a quasi-static speed field.

Recently, a new configuration, proposed by the group of Gordillo, has revealed a promising alternative by placing an extraction tube without any surrounding confinement in front of the injection tube (A. Evangelio, F. Campo-Cort'es, and J. M. Gordillo, Simple *and double microemulsions via the capillary breakup of highly stretched liquid jets*, Journal of Fluid Mechanics, 804:550-577, October 2016) as shown in FIG. 1e. The continuous phase is therefore accelerated in the extraction tube, thus creating a pressure drop, exactly like in a Venturi tube. Gordillo and collaborators have exploited this pressure drop to create a stretched air jet of the dispersed phase, that further destabilizes into micro-bubbles, a mechanism which is referred to as the "tip streaming". For large Reynolds numbers of the continuous phase, the pressure drop is governed by inertia, while for low Reynolds numbers, it is rather governed by viscous forces. This latter condition has also been exploited by the same authors to produce simple and double emulsions.

SUMMARY

The present disclosure is related to a device for generating an emulsion or droplet generator comprising:
  a cavity comprising a first pressurized phase
  at least one input capillary of a second phase
  an output capillary coaxially aligned with the at least one input capillary;
characterized in that the opening of the tip of the at least one input capillary have an internal diameter of less than half the internal diameter of the output capillary and the cavity presents a cross section perpendicular to the output capillary at least twice (preferably four times) the surface of the cross section of the output capillary.

Advantageously, the cavity has all dimensions larger than the inner dimension of all input capillary feeding the device and of the output capillary extracting the produced droplets. Preferably, all dimensions of the cavity are larger than 2 mm (advantageously larger than 4 mm), while the inner diameter of all input and output capillary are smaller than 1 mm.

The cross section of the cavity is advantageously selected so that in use, the average speed field in the cavity is at least two times (preferably four times) lower than in the output capillary. This feature permits to locate the pressure drop of the continuous phase in the output capillary, thereby increasing potential throughput of the system. Advantageously, the speed field in the cavity is quasi-static.

In the present invention, a speed field is considered quasi static when the cavity presents a cross section perpendicular to the output capillary at least ten times the surface of the cross section of the output capillary.

Preferably, the output capillary is a microfluidic capillary having an hydraulic diameter of less than 1 mm, advantageously less than 500 µm, and the cavity is a macroscopic cavity having all dimensions of more than 3 mm, preferably more than 5 mm.

The hydraulic diameter, DH, is a commonly used term when handling flow in non-circular tubes and channels. It is defined as:

$$D_H = \frac{4A}{P}$$

A is the cross-sectional area of the flow,
P is the wetted perimeter of the cross-section.
In case of a cylindrical channel, the hydraulic diameter is equal to the geometrical diameter.

The cavity can be spherical, parallepipedic or ovoid, as far as it permits in use a quasi-static speed field.

The different capillaries can have any cross section shape, but are preferably cylindrical.

Preferably, the distance d between the tip of the input capillary and the collecting end of the output capillary is comprised between plus two and minus two times the internal diameter of the tip of the input capillary.

Advantageously, the cavity is fed by a first phase input tubing connected to a first phase reservoir, the pressure in the reservoir being regulated by a first pressure regulator. Preferably, the first phase input tubing comprises means for measuring flow rate, and eventually means for modifying resistance of the tubing to flow.

Correspondingly, the second phase is preferably fed by a second phase input tubing connected to a second phase reservoir, the pressure in the reservoir being regulated by a second pressure regulator and, preferably, the second phase input tubing comprises means for measuring flow rate, and eventually means for modifying resistance of the tubing to flow.

Advantageously, the device of the invention comprises means, such as a camera connected to a microscope, for observing the droplets produced, in use, by the device in the output capillary. In that case, the cavity comprises preferably transparent window(s), eventually made of material transparent to IR or UV radiation such as quartz. In the latter case, UV can be used for example for polymer curing purposes, or for fluorescence observation purposes.

Preferably, the device of the invention comprises a control unit connected to the means for observing the droplets, the control unit determining the droplets diameter in real time, and controlling the pressure of the first and second phase to regulate the droplets diameter according to a predetermined value. This value is for example a target value introduced in the control unit by a user.

Advantageously, the cavity comprises thermoregulation means. This is particularly useful when the system is used for chemistry purposes wherein temperature is a key parameter.

Preferably, the tip of the input capillary comprises a nozzle obtained by micromachining or 3D microprinting, this latter process being preferred.

Advantageously, the input capillary comprises two or more coaxial capillaries for producing complex emulsion of the type ABC, ABCD, ABA, . . . whatever the wetting conditions or the degree of miscibility of each phase.

Another aspect of the invention is related to a method using the device of the invention wherein the diameter of the droplets is at least two times bigger than the output diameter of the tip of the input capillary.

In the method of the invention the flow rate of the input capillary $Q_d$, and the flowrate of the continuous phase $Q_c$ are advantageously selected so that the system operates in the dripping regime also referred to squeezing regime.

Preferably, the method of the invention comprises the steps of:
providing a device according to the invention;
feeding the cavity with the first phase (continuous phase) at flowrate $Q_c$,
feeding the input capillary with the second phase (dispersed or droplet phase) at flowrate $Q_d$;
collect the produced emulsion of droplets of the second phase dispersed in the first phase.

Advantageously, the method of the invention comprises the initial step of determining $Q_c$ and $Q_d$ to obtain a target droplets diameter.

Preferably, the method of the invention comprises the step of continuously regulating $Q_c$ and $Q_d$ by a closed loop regulation based upon real time measurement of the droplets diameter to maintain the diameter as close as possible to the target value.

Advantageously the flowrates are regulated by controlling the pressure applied to the first and second phase feeding system.

LIST OF REFERENCE SYMBOLS 1. output or collector capillary
2. Droplets of second (i.e. dispersed) phase
3. flow of first (i.e. continuous) continuous phase
4. nozzle at the tip of the input capillary
5. cavity wall
6. input capillary
7. cavity
9. Control unit
10. output capillary bulkhead 11. additional cavity access (generally closed bulkhead)
12. dispersed phase input capillary bulkhead
13. dispersed phase input flow resistance means
14. dispersed phase input flowmeter
15. dispersed phase input tubing
16. dispersed phase sealed container
17. pressure input tubing
18. pressure regulating unit for the dispersed phase
19. bulkhead for continuous phase input
20. continuous phase input tubing
21. continuous phase flow resistance means
22. continuous phase flowmeter
23. continuous phase container
24. Pressurizing tubing for the continuous phase
25. pressure regulating unit for the continuous phase
26. output tubing
27. emulsion
28. Window
29. Camera

DETAILED DESCRIPTION

The device of the present disclosure was initially developed for various microfluidic applications requiring high-throughput emulsification for which existing systems fail to fully comply. It allows the long term production of droplets in a very robust and reproducible way because of its technical specifications on the one hand, and on the other hand because of the physical mechanisms on which it relies. The device of the invention is therefore a very good starting point for the development of an integrated droplet production system for the chemical and pharmaceutical industry where, existing solutions failed to reach the production stage.

As compared to confined configurations (FIGS. 1a-d), the unconfined one illustrated in FIG. 1e allows for higher throughput as the pressure drop is only localized in the extraction tube. However, it exclusively works in the jetting regime, which is not in favor of monodispersity.

Figure 2:
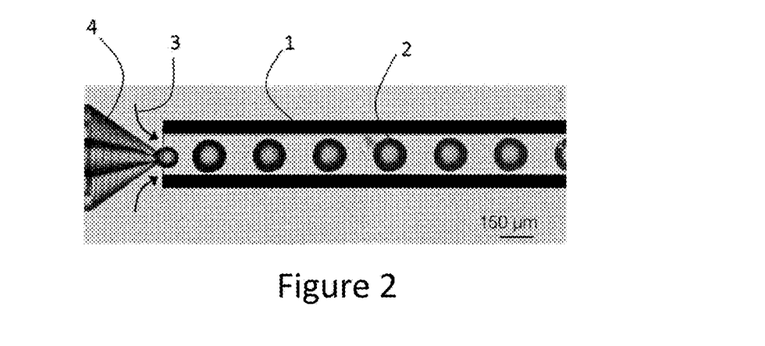
FIG. 2 represents a microscope picture of an experiment according to the invention.
Figure 3:
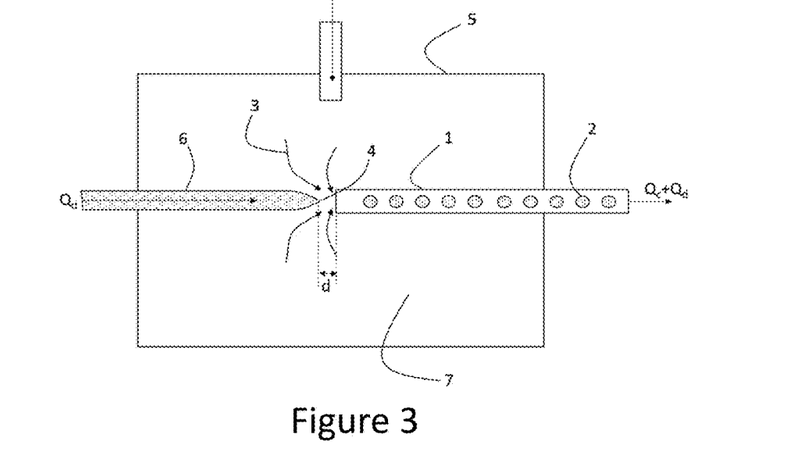
FIG. 3 represents a schematic view of the device of the invention.

The general configuration of the invention is illustrated in FIGS. 2 and 3. The system of the invention is able to generate mono-dispersed droplets or bubbles at high-throughput. In this setup, the system is optimized to operate in dripping (or squeezing) mode. Interestingly, in this dripping regime, the size of the injection nozzle 4 is about twice smaller than the desired size of the droplets/bubbles 2; a requirement that is not necessary in the jetting regime explored by the group of Gordillo. For example, to produce 100 µm droplets, a 40 µm inner-diameter nozzle 4 was designed and placed in front of the extraction tube 1, as illustrated in FIG. 2.

According to the standards of the National Institute of Standards and Technology (NIST), a particle (in this case droplet or bubble) distribution may be considered monodisperse if at least 90% of the distribution lies within 5% of the median size (Particle Size Characterization, Special Publication 960-961, January 2001). This is equivalent, for a normal distribution, to a standard deviation to average diameter ratio of less than 2%.

In this configuration, the system operates in the so-called unconfined squeezed flow, the cavity 7 containing the continuous phase having a much larger cross section than the output capillary 1, so that the speed field in the cavity is close to zero at large distance of the collecting end of the output capillary 1. The speed difference of the continuous phase between the cavity and the output capillary inducing a large pressure drop according to Bernouilli's equation, as would produce a Venturi tube in the case of bubble generation without surfactant, or according to Stokes equation in the case of a droplet generation dominated by shear forces at the interface.

Example

3D-Printed Nozzle

Figure 4:
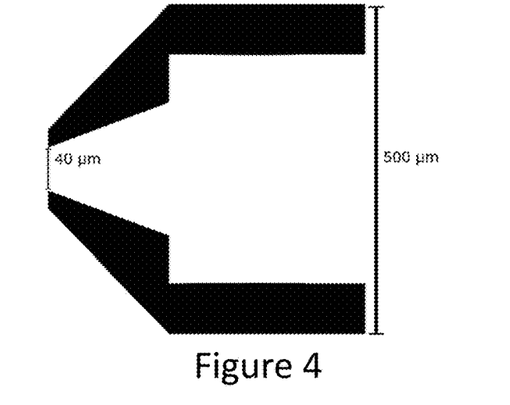
FIG. 4 represents a typical nozzle geometry according to the invention.

The nozzle 4 showed in FIG. 2 has been printed using a 3D printer. The UV-polymerized material is a photosensitive resin similar to SU-8 widely used in electronics, assuring a very good resistance to most oils and solvents. The inside geometry of the nozzle has been designed so as to assure an easy introduction and then gluing of a capillary tubing, with neither leakage nor clogging during operation. For that purpose, a stepped geometry is used. The inside cross section decreases step by step from the nozzle entrance to the basis of the conical part. The capillary can thereby be easily introduced to the end of the cylindrical portion of the nozzle with a minimal gap between both parts at the cone basis. This ensures that no glue will reach the inside of the capillary during the gluing process on one hand, and on the other hand that the capillary will be perfectly aligned with the nozzle axis. Typical size and geometry of a 3D-printed single emulsion nozzle are shown in FIG. 4.

Figure 5:
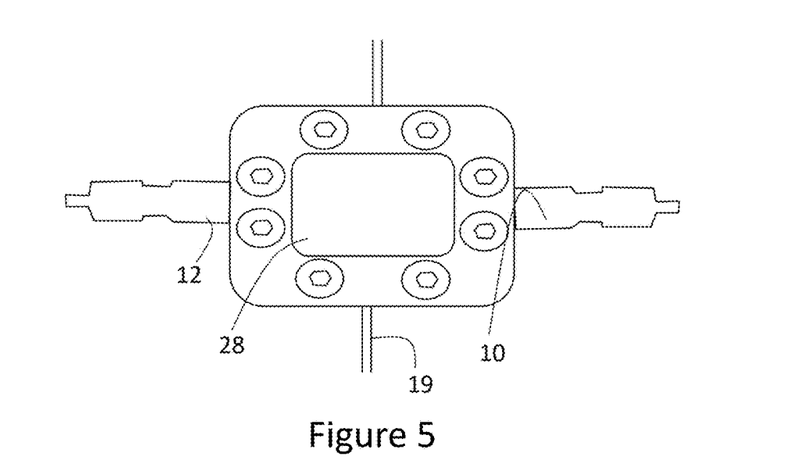
FIG. 5 represents a schematic diagram of an example of device of the invention showing the metallic body of the system with the different input and output.
Figure 6:
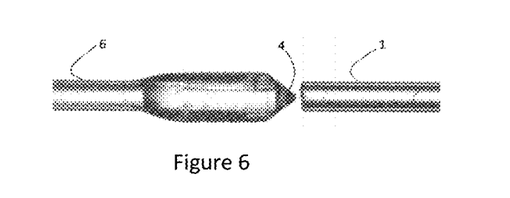
FIG. 6 shows an enlarged picture of the input and output capillaries through the window of the device of FIG. 5.

At the nozzle tip, two conditions must be fulfilled to promote the formation of small droplets. First, the edge width has to be as small as possible so that the exiting liquid wets the minimum resin area, and secondly, the angle of the cone tip has to be steep enough so that the liquid wetting the edge will not spread on the cone lateral surface (FIG. 5b).

Capillary Tubing

As mentioned before, two capillaries 1,6 are part of the device of the invention, one supporting a nozzle 4 at its end and carrying the dispersed phase and another one 1 for the droplet collection, as showed in FIG. 3. They are preferably made of fused silica coated with a 20 µm polyimide transparent film what makes the droplet visible for eye or camera observation.

Other materials, such as stainless steel or tungsten carbide, could possibly be used for the input and output capillaries 1,6 when transparency is not required.

Stainless Steel Body

FIG. 5 shows a general view of the mechanical parts of the device of the example.

A stainless steel reservoir filled with the continuous phase and containing the two aligned capillaries allows for the non-confined dripping configuration of the invention. It comprises a main body on which two windows 28 and two connection system 10,12 for the capillaries introduction are assembled. On the other lateral sides, two connections 11,19 are intended for the connection of the continuous phase supply and purge.

Windows 28 are preferably made of 1 mm width glass disc pressed onto an O-ring seal inserted into a groove. Quartz windows are also available for applications where UV or IR light transmission is needed. This system allows for a very easy access to the cavity 7 for cleaning purpose. The thickness of the windows 28 can be adapted to particular size or operating pressure.

Predictive Model for the Droplet Size

This model, aims to establish a relationship between the flow rates in the system and the droplet diameter. It is used as a predictive tool to determine the initial working parameters for the generation of calibrated droplets (or bubbles) in the device. This model is advantageously used to regulate the drop size, by using a closed loop regulation system wherein a controller unit 9 connected to a camera 29 determines the drop diameter and modifies the pressures applied to the phases by pressure controllers 18,25 connected to the controller unit 9.

Figure 7:
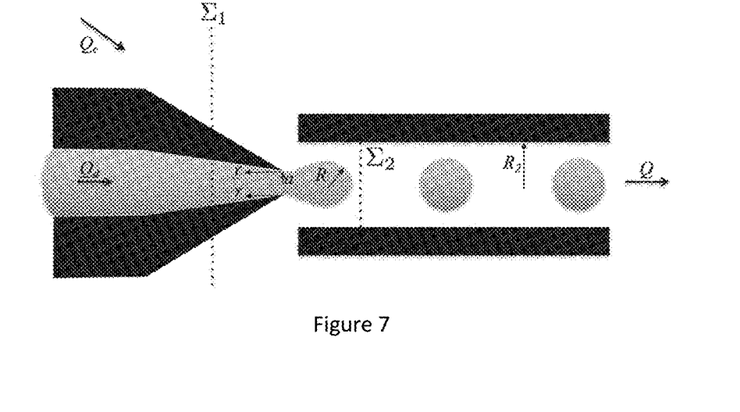
FIG. 7 represents the different parameters of the model developed in the invention.

The model is based on the assumption that the droplet will detach from the nozzle tip when the viscous force $F_\mu$ applied on the droplet becomes greater than the surface tension force $F_\gamma$ keeping the droplet attached to the nozzle tip. This viscous force is approximated by using a modified Stokes law for a spherical particle in a flowing solution as $$F_\mu = 6\rho\mu_c(R-a)(v_c - v_d) \quad (1)$$

where R is the droplet radius, a is the radius at the nozzle tip, $\mu_c$ is the viscosity of the continuous phase, $v_c$ is the speed of the continuous phase and $v_d$ is the speed of the dispersed phase (see FIG. 7). The R−a term reflects the fact that the cross section of the nozzle tip works to shield part of the growing droplet from the viscous force. The velocities $v_c$ and $v_d$ are estimated from the flow rates and their associated cross-sectional areas in the system. Notice that the cross-sectional areas for both phases are variable because of the growing droplet radius R. Taking this into account, velocities are expressed as $$v_C = \frac{Q_c}{\pi(R_2^2 - R^2)} \text{ and } v_d = \frac{Q_d}{\pi R^2}$$

where $R_2$ is the internal radius at the tip of the output capillary.

In the case of dominant inertial forces $$\left(\frac{\mu_c}{\mu_d} \ll 1\right),$$

the dominant term acting against the surface tension is the Bernouilli force $F_\rho$ due to the pressure difference between the cavity (section $\Sigma_1$) and the output capillary (section $\Sigma_2$).

$$F_\rho = \frac{\rho_c}{2}\left(v_{c,\Sigma_2}^2 - v_{c,\Sigma_1}^2\right)\pi(R_2^2 - R^2) \quad (1')$$

where $\rho_c$ is the density of the continuous phase and $\Sigma_1$ and $\Sigma_2$ are the cross sections far in the cavity and at the entrance of the output capillary, respectively. The droplet generation better works for $\Sigma_1 \gg \Sigma_2$ such as the velocity in the cavity $v_{c,\Sigma_1}$ is negligible as compared to the velocity in the output capillary $v_{c,\Sigma_2}$. The $R_2-R$ term reflects the fact that the cross section of the droplet works to shield part of the cross section of the output capillary.

The surface tension force is $$F_\gamma = 2\pi a\gamma \quad (2)$$

where γ is the interfacial tension between continuous and dispersed phases that is assumed to apply in the longitudinal direction provided the elongated shape of the attached droplet.

Because these expressions for the two forces result from approximations, a corrective factor α is added in the equation for the force balance such as $$F_\mu + F_\rho = F_\gamma \alpha \quad (3)$$

In the case of dominant viscous forces $$\left(\frac{\mu_c}{\mu_d} \gg 1\right),$$

$F_\rho$ can be neglected, and by injecting the expressions 1 and 2 for the forces, equation 3 becomes $$3Ca\frac{R-a}{\alpha a}\left(\frac{R_2^2}{R_2^2 - R^2} - \frac{Q_d R_2^2}{Q_c R^2}\right) = 1 \quad (4)$$

Where $$Ca = \frac{Q_c \mu_c}{\pi R_2^2 \gamma}$$

is a capillary number representing the relative effect of viscous force versus surface tension. By assuming $Q_d \ll Q_c$, the latest equation simplifies as $$3\frac{Ca}{\alpha}\left(\frac{R}{a} - 1\right)\left(\frac{1}{1 - \left(\frac{R}{R_2}\right)^2}\right) = 1 \quad (5)$$

The droplet diameter at rupture becomes the solution of an algebraic second order equation whose the only physically meaningful solution is $$R = -\frac{3R_2^2 Ca}{2a} + R_2\sqrt{1 + \frac{3Ca}{\alpha} + \frac{9R_2^2 Ca^2}{2a^2\alpha^2}} \quad (6)$$

Figure 8:
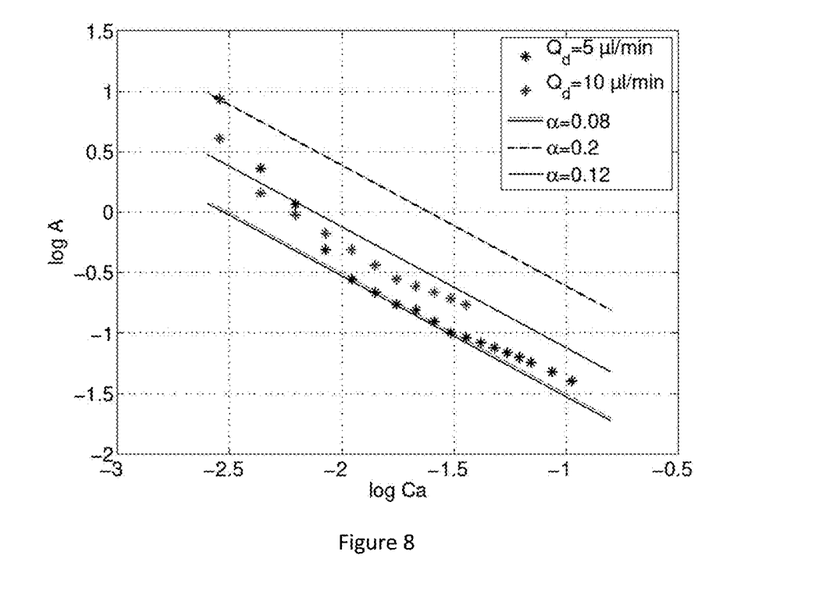
FIG. 8 represents a diagram of experimental data (*) and lines corresponding to several $\alpha$. $\gamma$=50 mNm−1, $\mu c$=5 mPas. Dispersed phase: water. Continuous phase:
mineral oil without surfactant.
Figure 9:
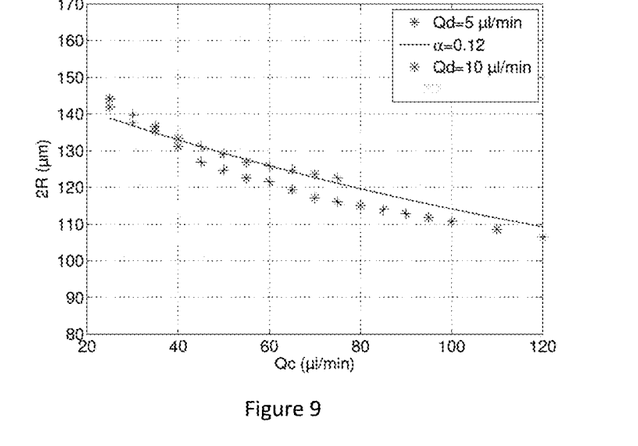
FIG. 9 represents the droplet diameter 2R as a function of the continuous phase flow rate $Q_c$. $\gamma$=50 mNm$^{-1}$ and $\mu_c$=5 mPas. Dispersed phase: water. Continuous phase: mineral oil without surfactant.

To determine α, equation 5 is written as $$\alpha = \frac{3}{a}\frac{R-a}{1 - \left(\frac{R}{R_2}\right)^2}Ca = ACa \quad (7)$$

Where the term A contains geometrical parameters. log(A) is then plotted versus log(Ca) using data coming from experiments. As shown on FIG. 8, experimental data are located between both lines corresponding to α=0.08 and α=0.2. Assuming a mean value for the critical capillary number, α=0.12, the droplet diameter 2R is then plotted in function of the continuous phase flow rate $Q_c$ (FIG. 9).

In the case of dominant inertial forces $$\left(\frac{\mu_c}{\mu_d} \ll 1\right),$$

$F_\mu$ can be neglected, and by injecting the expression (1') and 2 for the forces, and using $v_{c,\Sigma_2} = v_c$, equation 3 gives $$\frac{R}{R_2} = \sqrt{1 - \frac{Ca}{4\alpha}\text{Re}\frac{R_2}{a}}$$

with $$\text{Re} = \frac{\rho_c Q_c}{\pi R_2 \mu_C}$$

is the Reynolds number based on the continuous phase.

Predictive Model for the Pressure

In this section, an electrical circuit analogy (or lumped model) is proposed to predict the applied pressure on the continuous phase so as to obtain the desired continuous phase flow rate. The model can also provide flow resistance values to be used in the circuit to avoid that the pressure modified on one channel will impact the flow rate on the other. In other words, using the right flow resistances results in independent flow rates in the two channels.

Figure 10:
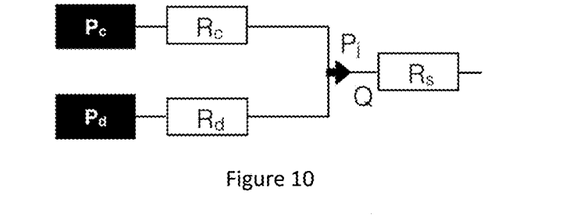
FIG. 10 represents an electrical analogy for the microfluidic circuit of an example of the invention.

The electrical circuit analogy is based on the scheme of FIG. 10. $P_c$ and $P_d$ are the pressures applied on the continuous and dispersed phase, respectively, $R_c$ and $R_d$ are the flow resistances of the channels for the continuous and dispersed phase, respectively, upstream of the nozzle. Q is the sum of both flow rates and $R_s$ is the flow resistance of the channel downstream of the nozzle. Following the electrical analogy, the relation between P, Q and R is similar to the Ohm's law, such as $$P = QR \quad (8)$$

This "Kirchoff law for fluidic circuit" is then applied to the entire circuit and Q is expressed as $$Q = \frac{P_c R_d + P_d R_c}{R_s R_d + R_s R_c + R_c R_d} \quad (9)$$

The resistance values are evaluated using the Hagen-Poiseuille equation $$\Delta P_i = \frac{128 \mu_i L_i Q_i}{\pi d_i^4} = Q_i R_i, \; i = (d, c, s) \quad (10)$$

where $L_i$ is the tubing length, $d_i$ the tubing diameter, $\Delta P_i$ the pressure drop across $L_i$ and is then defined as ($\Delta P$ at connectors is neglected in this model)

$$R_i = \frac{128 \mu_i L_i}{\pi d_i^4}. \quad (11)$$

The evaluation of $R_s$ in (9) assumes that the viscosity of the output stream is equal to the viscosity of the continuous phase. This is generally a good approximation if the continuous phase flow rate is higher than the droplet flow rate.

Figure 11:
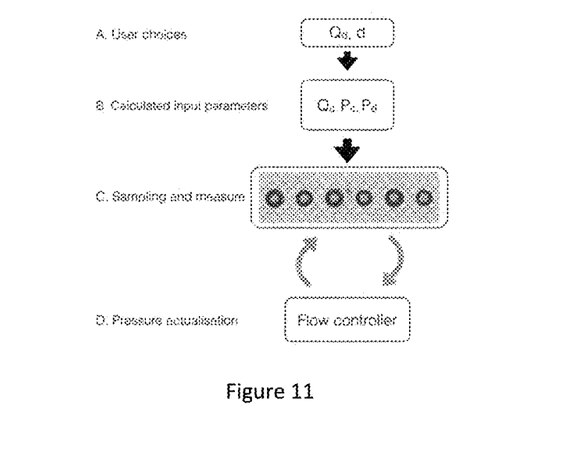
FIG. 11 represents a feedback loop for the continuous control and adjustment of the droplet diameter.

In conjunction with the results obtained to predict the size of the droplets in function of the continuous flow rate, the model presented allows the user of the device of the invention to use operational starting pressure values to generate the desired droplet size and flow-rate. The fine tuning of the pressure can then be continuously operated during the droplet generation process using a feed-back loop, as shown in FIG. 11. The measured diameter of the droplets is compared with the target value to, first, find the best a coefficient corresponding to the experimental working setup, and then to continuously adapt the pressure to meet the size requirement.

Experimental Results

Figure 12:
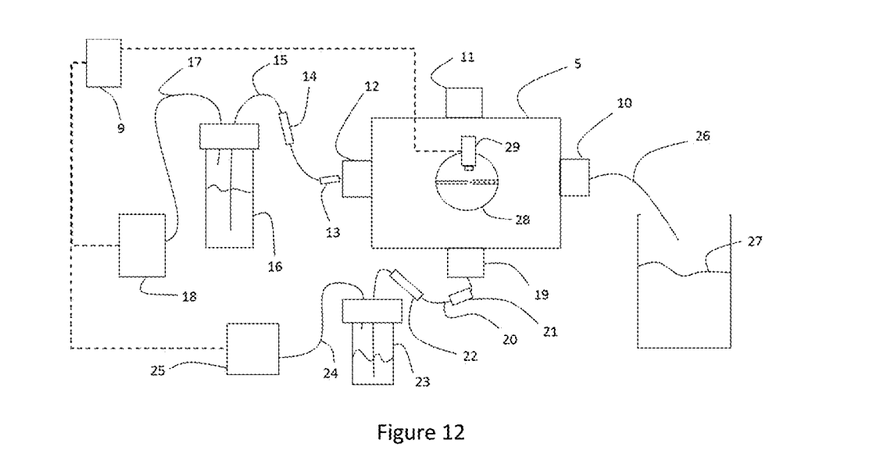
FIG. 12 represents a schematic view of the entire system for two phases emulsion.

The setup for the droplet generation of the example is shown in FIG. 12. A high-speed camera 29 and microscope system is typically used to view the droplet formation. Videos are recorded and later analyzed to estimate the droplet size and droplet production rates. The flow of each fluid is driven by pressure controllers 18,25 that use compressed air injected through tubing 17,24 to drive each fluid. In conjunction with flow-rate meters 14,22, the pressure controllers 18,25 allows fine tuning of both flow rates with a very low response time and a pulseless liquid flow, which is advantageous for achieving monodispersity. In each channel, the flow rate is proportional to the pressure and inversely proportional to the flow resistance. These resistances are designed using the predictive model developed before and are added in the setup to equalize the pressures at the nozzle tip, avoiding backflow and ensuring that there will be no interference between both channels. In others words, even if the flow rates of both phases are dramatically different, typically on a ratio 10:1, operating pressures must be similar. That requirement is met through the choice of resistances. Finally, resistances also lend a wider operating range so that the flow ratios can be adjusted with greater control.

In the tested design, the nozzle 4 output diameter was 40 μm, the distance d between the nozzle 4 and the collector 1 capillary: 40 μm, and, finally, the inside diameter of the collector capillary was 180 μm.

To ensure that a minimum of dust is introduced into the system, the fluid pumped to the system have previously been filtered through a 0.2 μm pore size filter and a ferrule with integrated filter is used as an in-line filter in the tubing leading to the nozzle 4.

Droplets of water and ethanol in aqueous solution have been generated in silicon or mineral oil. For example, water droplets of 125 μm diameter have been produced at a 1707 Hz production rate, at a flow rate of 100 μl/min. This value could certainly be increased by using lower flow resistances or a more powerful pump.

Figure 13:
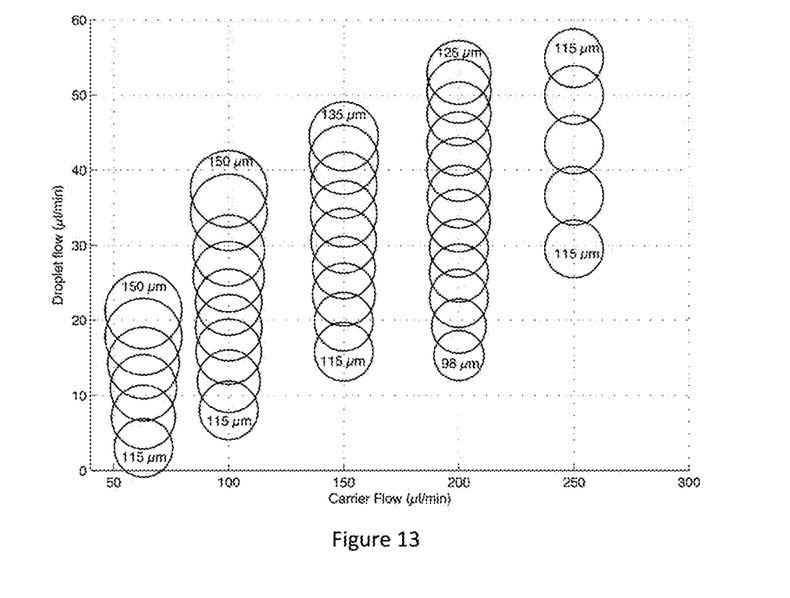
FIG. 13 shows the droplet diameters as a function of phases flow rates.

One of these tests is reported in FIG. 13, where it can be seen that at high continuous phase flow rate, the droplet size becomes independent of the dispersed flow rates.

It is worth to note that the maximum of 50 μl/min for the droplet flow rate reached in this experiment is higher than the transition dripping-jetting obtained using a glass chip under the same conditions. Furthermore, no wetting issues have been reported in long term operation, unlike glass chip with hydrophobic coating with which severe wetting issue is generally observed when used for the long term production of droplets of coating aggressive chemicals.

The invention claimed is:

1. A device for generating bubbles or droplets, the device comprising:
    a cavity comprising a first pressurized phase;
    at least one input capillary of a second phase;
    an output capillary coaxially aligned with the at least one input capillary;
    means for observing the droplets produced, in use, by the device in the output capillary; and
    a control unit coupled to the means for observing the droplets, the control unit being configured to determine a diameter of the droplets and to control the pressure of the first and second phase to regulate the diameter of the droplets according to a predetermined value;
    wherein an opening of a tip of the at least one input capillary has an internal diameter of less than half the internal diameter of the output capillary; and wherein all dimensions of the cavity are larger than 3 mm, and the output capillary has a hydraulic diameter smaller than 500 µm.

2. The device according to claim 1, further comprising a first phase input tubing connected to a first phase reservoir, the pressure in the reservoir being regulated by a first pressure regulator.

3. The device according to claim 2, wherein the first phase input tubing comprises means for measuring flow.

4. The device according to claim 1, further comprising a second phase input tubing connected to a second phase reservoir, the pressure in the reservoir being regulated by a second pressure regulator.

5. The device according to claim 4 wherein the second phase input tubing comprises means for measuring flow.

6. The device according to claim 1, wherein the cavity comprises thermoregulation means.

7. The device according to claim 1, wherein the input capillary comprises at least two coaxial capillaries for producing complex emulsion of the type ABC.

8. The device of claim 1, wherein a cross section of the cavity is configured such that an average speed field in the cavity is quasi-static.

9. The device of claim 1, wherein a cross section of the cavity has an area at least ten times as large as a cross section of the output capillary.

10. A method for generating bubbles or droplets, the method comprising:
generating bubbles or droplets using a device comprising a cavity comprising a first pressurized phase, at least one input capillary of a second phase, and an output capillary coaxially aligned with the at least one input capillary, wherein an opening of a tip of the at least one input capillary has an internal diameter of less than half the internal diameter of the output capillary, and wherein all dimensions of the cavity are larger than 3 mm, and the output capillary has a hydraulic diameter smaller than 500 µm;
observing the bubbles or droplets using a control unit connected to a means for observing the bubbles or droplets in the output capillary,
determining a diameter of the bubbles or droplets using the control unit; and
regulating the diameter of the bubbles or droplets according to a predetermined value by controlling the pressure of the first and second phase using one or more pressure regulators, wherein the diameter of the bubbles or droplets is at least two times bigger than the output diameter of the tip of the at least one input capillary.

11. The method of claim 10, wherein a flowrate $Q_d$ of the at least one input capillary, and a flowrate $Q_c$ of the first pressurized phase are configured so that the system operates in a dripping regime.

12. A method of manufacturing a device for generating bubbles or droplets, the method comprising:
providing a device including a cavity having a first pressurized phase, at least one input capillary of a second phase, and an output capillary coaxially aligned with the at least one input capillary; and
producing a nozzle of a tip of the at least one input capillary by micromachining or 3D microprinting;
wherein an opening of a tip of the at least one input capillary has an internal diameter of less than half the internal diameter of the output capillary, and wherein all dimensions of the cavity are larger than 3 mm, and the output capillary has a hydraulic diameter smaller than 500 µm.

\* \* \* \* \*